US012577149B2

(12) United States Patent
Ritzberger

(10) Patent No.: US 12,577,149 B2
(45) Date of Patent: *Mar. 17, 2026

(54) LITHIUM SILICATE GLASS CERAMIC WITH EASY MACHINABILITY

(71) Applicant: Ivoclar Vivadent AG, Schaan (LI)

(72) Inventor: Christian Ritzberger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 618 days.

This patent is subject to a terminal disclaimer.

(21) Appl. No.: 17/821,111

(22) Filed: Aug. 19, 2022

(65) Prior Publication Data

US 2023/0073207 A1 Mar. 9, 2023

(30) Foreign Application Priority Data

Aug. 23, 2021 (EP) .................................... 21192546

(51) Int. Cl.
| | |
|---|---|
| *C03C 10/00* | (2006.01) |
| *A61C 13/083* | (2006.01) |
| *C03B 32/02* | (2006.01) |
| *C03C 4/00* | (2006.01) |
| *A61C 13/00* | (2006.01) |

(52) U.S. Cl.
CPC ............ *C03C 10/00* (2013.01); *A61C 13/083* (2013.01); *C03B 32/02* (2013.01); *C03C 4/0021* (2013.01); *A61C 13/0004* (2013.01); *C03C 2204/00* (2013.01)

(58) Field of Classification Search
CPC ... C03C 10/00; C03C 4/0021; C03C 2204/00; C03C 10/0009; C03C 3/097; C03C 10/0027; A61C 13/083; A61C 13/0004; C03B 32/02; A61K 6/802
See application file for complete search history.

(56) References Cited

U.S. PATENT DOCUMENTS

| | | | | |
|---|---|---|---|---|
| 6,376,397 | B1 | 4/2002 | Petticrew | |
| 7,316,740 | B2 * | 1/2008 | Schweiger | A61K 6/78 |
| | | | | 106/35 |
| 9,101,439 | B2 * | 8/2015 | Ritzberger | C03C 10/00 |
| 9,402,699 | B2 * | 8/2016 | Ritzberger | C03C 4/0021 |
| 2014/0000314 | A1 * | 1/2014 | Ritzberger | C04B 41/5023 |
| | | | | 264/16 |

| | | | | |
|---|---|---|---|---|
| 2014/0225290 | A1 * | 8/2014 | Ritzberger | C03C 3/097 |
| | | | | 264/17 |
| 2015/0104655 | A1 | 4/2015 | Kim et al. | |
| 2018/0105454 | A1 * | 4/2018 | Zheng | C03B 32/02 |
| 2023/0072037 | A1 * | 3/2023 | Ritzberger | C03C 12/00 |

FOREIGN PATENT DOCUMENTS

| | | | |
|---|---|---|---|
| EP | 0231773 | A1 | 8/1987 |
| EP | 0827941 | A1 | 3/1998 |
| EP | 0916625 | A1 | 5/1999 |
| EP | 1688398 | A1 | 8/2006 |

OTHER PUBLICATIONS https://www.matweb.com/search/datasheet.aspx?matguid=2b44726f14fc46059e98e26c082c3db1&n=1&ckck=1 accessed Aug. 1, 2025 (Year: 2025).*
https://en.wikipedia.org/wiki/Lithium_metasilicate accessed Aug. 1, 2025 (Year: 2025).*
Dittmer, M., Glasses and Glass-Ceramics in the System of MgO—Al2O3—SiO2 with ZrO2 as Nucleating Agent, Doctoral Thesis, Friedrich-Schiller-University, Jena, Germany, Jan. 3, 2012, 139 pages.
Borom, et al., Strength and Microstructure in Lithium Disilicate Glass Ceramics, J. Am. Ceram. Soc., Jan. 1975, vol. No. 9-10, pp. 285-391.
Bengisu, M., et al., Effect of long-term heating and thermal cycling on thermal expansion, phase distribution, and microhardness of lithium aluminosilicate glass-ceramics, Journal of Non-Crystalline Solids, Oct. 3, 2003, vol. 331, Nos. 1-3, pp. 137-144.

* cited by examiner

*Primary Examiner* — Cameron K Miller
(74) *Attorney, Agent, or Firm* — Ann M. Knab; Thad McMurray

(57) ABSTRACT

A lithium silicate glass ceramic having lithium metasilicate as main crystal phase and having not more than 30 wt.-% of lithium metasilicate crystals and having the following components in the amounts indicated:

| Component | Wt.-% |
|---|---|
| $SiO_2$ | 71.0 to 82.0 |
| $Li_2O$ | 6.0 to 14.0 |
| $Me^I{}_2O$ | 4.0 to 15.0 |
| $Al_2O_3$ | 2.0 to 10.0 |
| $P_2O_5$ | 0.5 to 7.0, | wherein $Me^I{}_2O$ is selected from $Na_2O$, $K_2O$, $Rb_2O$, $Cs_2O$ and mixtures thereof, and
wherein the molar ratio of $SiO_2$ to $Li_2O$ is in the range of 2.5 to 5.0.

18 Claims, No Drawings

LITHIUM SILICATE GLASS CERAMIC WITH EASY MACHINABILITY

CROSS-REFERENCE TO RELATED APPLICATIONS

This application claims priority to European patent application No. 21192546.6 filed on Aug. 23, 2021, which disclosure is incorporated herein by reference in its entirety.

TECHNICAL FIELD

The invention relates to lithium silicate glass ceramic, which is particularly suitable for use in dentistry and in particular for the preparation of dental restorations, and to precursors for the preparation of this glass ceramic.

BACKGROUND

Lithium silicate glass ceramics are generally characterized by very good mechanical properties, which is why they have been used for some time in the dental field, primarily for the fabrication of dental crowns and small dental bridges. WO 95/32678 A2 and corresponding U.S. Pat. No. 6,376, 397, which U.S. patent is hereby incorporated by reference in its entirety, describe lithium disilicate glass ceramics which are processed into dental restorations by pressing in a viscous state. However, the use of a deformable crucible is mandatory, which makes the processing very complex.

EP 0 827 941 A1 and EP 0 916 625 A1 disclose lithium disilicate glass ceramics which can be given the shape of the desired dental restoration by pressing or machining.

EP 1 505 041 A1 and corresponding U.S. Pat. No. 7,316,740, which U.S. patent is hereby incorporated by reference in its entirety, and EP 1 688 398 A1 describe processes for producing dental restorations of lithium disilicate glass ceramics. In this process, a glass ceramic with lithium metasilicate as the main crystal phase is first produced as a precursor, which can be machined, e.g. by means of a CAD/CAM process. This precursor is then subjected to further heat treatment to form the desired high-strength lithium disilicate glass ceramic.

The machining of conventional lithium disilicate glass ceramics is difficult due to their high strength and is therefore regularly associated with high wear of the tools used. The machining of lithium metasilicate glass ceramics is basically easier and possible with less tool wear. However, the known lithium metasilicate glass ceramics can only be machined relatively slowly, for example by the grinding tools of common CAD/CAM machines. This is particularly problematic for the frequently desired provision of a patient with a dental restoration in a single treatment session (so-called chairside treatment).

SUMMARY

Therefore, there is a need for lithium silicate glass ceramics, which can be machined faster than the known lithium metasilicate glass ceramics and can subsequently be converted into high-strength dental products which also exhibit high chemical resistance and excellent optical properties.

This problem is solved by the lithium silicate glass ceramic according to the claims. Subject of the invention are also the starting glass according to the claims and a process according to the claims.

DETAILED DESCRIPTION

The lithium silicate glass ceramic according to the invention is characterized in that it has lithium metasilicate as main crystal phase and comprises the following components in the amounts indicated:

| Component | Wt.-% |
|---|---|
| $SiO_2$ | 71.0 to 82.0 |
| $Li_2O$ | 6.0 to 14.0 |
| $Me^{I}_2O$ | 4.0 to 15.0 |
| $Al_2O_3$ | 2.0 to 10.0 |
| $P_2O_5$ | 0.5 to 7.0, | wherein $Me^{I}_2O$ is selected from $Na_2O$, $K_2O$, $Rb_2O$, $Cs_2O$ and mixtures thereof, and wherein the molar ratio of $SiO_2$ to $Li_2O$ is in the range of 2.5 to 5.0.

Surprisingly, it has been shown that the glass ceramic according to the invention incorporates a combination of very desirable mechanical and optical properties, as required especially for a dental restoration material. This glass ceramic has a low strength and toughness and accordingly can be easily and in a very short time machined into the shape of even complicated dental restorations, but after such machining can be converted by heat treatment into a glass ceramic product having excellent mechanical properties, excellent optical properties and very good chemical stability.

The team "main crystal phase" is used to describe the crystal phase which has the highest proportion by mass of all the crystal phases present in the glass ceramic. The masses of the crystal phases are determined in particular using the Rietveld method. A suitable procedure for the quantitative analysis of the crystal phases by means of the Rietveld method is described, for example, in the dissertation by M. Dittmer "Glasses And Glass-Ceramics In The System $MgO$—$Al_2O_3$—$SiO_2$ With $ZrO_2$ As Nucleating Agent," University of Jena 2011.

The lithium silicate glass ceramic according to the invention comprises in particular 73.1 to 80.0 and preferably 74.0 to 78.0 wt.-% $SiO_2$.

It is further preferred that the glass ceramic comprises 7.0 to 12.9, and preferably 8.0 to 12.0 wt.-% $Li_2O$. It is believed that $Li_2O$ lowers the viscosity of the glass matrix and thus promotes crystallization of the desired phases.

In another preferred embodiment, the glass ceramic comprises 5.1 to 10.0, and preferably 5.5 to 7.0 wt.-% of further oxide of monovalent elements $Me^{I}_2O$, wherein $Me^{I}_2O$ is selected from $Na_2O$, $K_2O$, $Rb_2O$, $Cs_2O$ and mixtures thereof, and is preferably $K_2O$.

Particularly preferably, the glass ceramic comprises at least one, and in particular all, of the following further oxides of monovalent elements $Me^{I}_2O$ in the amounts indicated:

| Component | Wt.-% |
|---|---|
| $Na_2O$ | 0 to 2.0 |
| $K_2O$ | 0 to 10.0 |
| $Rb_2O$ | 0 to 13.0 |
| $Cs_2O$ | 0 to 13.0. |

In a particularly preferred embodiment, the glass ceramic according to the invention comprises 2.0 to 10.0, preferably 5.1 to 9.0 and particularly preferably 5.5 to 7.0 wt.-% $K_2O$.

It is also preferred that the glass ceramic comprises 4.0 to 7.0, and preferably 5.1 to 6.5 wt.-% $Al_2O_3$.

In another preferred embodiment, the glass ceramic comprises 1.0 to 4.0, preferably 1.2 to 2.6, and particularly preferably 1.5 to 2.5 wt.-% $P_2O_5$. It is believed that the $P_2O_5$ acts as a nucleating agent.

It is further preferred that the glass ceramic comprises 1.0 to 9.0, preferably 2.0 to 8.0, and particularly preferably 3.0 to 7.0 wt.-% oxide of divalent elements $Me^{II}O$ selected from the group of MgO, CaO, SrO, ZnO and mixtures thereof.

In another preferred embodiment, the glass ceramic comprises less than 2.0 wt.-% of BaO. In particular, the glass ceramic is substantially free of BaO.

Preferably, the glass ceramic comprises at least one, and in particular all, of the following oxides of divalent elements $Me^{II}O$ in the amounts indicated:

| Component | Wt.-% |
|---|---|
| MgO | 0 to 4.0 |
| CaO | 0 to 4.0 |
| SrO | 0 to 7.0 |
| ZnO | 0 to 5.0. |

In a particularly preferred embodiment, the glass ceramic comprises 0.1 to 4.0, preferably 0.5 to 3.0, and particularly preferably 1.0 to 2.0 wt.-% MgO.

In another particularly preferred embodiment, the glass ceramic comprises 0.1 to 7.0, preferably 1.0 to 6.0, particularly preferably 2.0 to 5.0, and most preferably 3.0 to 4.0 wt.-% SrO.

Further, a glass ceramic is preferred which comprises 0 to 8.0, preferably 1.0 to 7.0 and particularly preferably 2.0 to 6.0 wt.-% of further oxide of trivalent elements $Me^{III}_2O_3$ selected from the group of $B_2O_3$, $Y_2O_3$, $La_2O_3$, $Ga_2O_3$, $In_2O_3$ and mixtures thereof.

Particularly preferably, the glass ceramic comprises at least one, and in particular all, of the following further oxides of trivalent elements $Me^{III}_2O_3$ in the amounts indicated:

| Component | Wt.-% |
|---|---|
| $B_2O_3$ | 0 to 4.0 |
| $Y_2O_3$ | 0 to 5.0 |
| $La2O_3$ | 0 to 5.0 |
| $Ga_2O_3$ | 0 to 3.0 |
| $In_2O_3$ | 0 to 5.0. |

Furthermore, a glass ceramic is preferred which comprises 0 to 10.0, preferably 1.0 to 8.0 and particularly preferably 2.0 to 6.0 wt.-% oxide of tetravalent elements $Me^{IV}O_2$ selected from the group of $TiO_2$, $ZrO_2$, $GeO_2$, $SnO_2$, $CeO_2$ and mixtures thereof.

Particularly preferably, the glass ceramic comprises at least one, and in particular all, of the following oxides of tetravalent elements $Me^{IV}O_2$ in the amounts indicated:

| Component | Wt.-% |
|---|---|
| $TiO_2$ | 0 to 4.0 |
| $ZrO_2$ | 0 to 3.0 |
| $GeO_2$ | 0 to 9.0 |
| $SnO_2$ | 0 to 3.0 |
| $CeO_2$ | 0 to 4.0. |

4

In another embodiment, the glass ceramic comprises 0 to 8.0, preferably 1.0 to 7.0, and particularly preferably 2.0 to 6.0 wt.-% of further oxide of pentavalent elements $Me^{V}_2O_5$ selected from the group consisting of $V_2O_5$, $Nb_2O_5$, $Ta_2O_5$, and mixtures thereof.

Particularly preferably, the glass ceramic comprises at least one, and in particular all, of the following further oxides of pentavalent elements $Me^{V}_2O_5$ in the amounts indicated:

| Component | Wt.-% |
|---|---|
| $V_2O_5$ | 0 to 2.0 |
| $Nb_2O_5$ | 0 to 5.0 |
| $Ta_2O_5$ | 0 to 5.0. |

In another embodiment, the glass ceramic comprises 0 to 5.0, preferably 1.0 to 4.0, and particularly preferably 2.0 to 3.0 wt.-% oxide of hexavalent elements $Me^{VI}O_3$ selected from the group consisting of $MoO_3$, $WO_3$, and mixtures thereof.

Particularly preferably, the glass ceramic comprises at least one, and in particular all, of the following oxides $Me^{VI}O_3$ in the amounts indicated:

| Component | Wt.-% |
|---|---|
| $MoO_3$ | 0 to 3.0 |
| $WO_3$ | 0 to 3.0. |

In a further embodiment, the glass ceramic according to the invention comprises 0 to 1.0 and in particular 0 to 0.5 wt.-% of fluorine.

Particularly preferred is a glass ceramic which comprises at least one, and preferably all, of the following components in the amounts indicated:

| Component | Wt.-% |
|---|---|
| $SiO_2$ | 73.1 to 80.0 |
| $Li_2O$ | 7.0 to 12.9 |
| $Me^{I}_2O$ | 4.0 to 15.0, in particular 5.1 to 10.0 |
| $Al_2O_3$ | 4.0 to 10.0 |
| $P_2O_5$ | 1.2 to 2.6 |
| $Me^{II}O$ | 0 to 9.0 |
| $Me^{III}_2O_3$ | 0 to 8.0 |
| $Me^{IV}O_2$ | 0 to 10.0 |
| $Me^{V}_2O_5$ | 0 to 8.0 |
| $Me^{VI}O_3$ | 0 to 5.0 |
| Fluorine | 0 to 1.0, | wherein $Me^{I}_2O$, $Me^{II}O$, $Me^{III}_2O_3$, $Me^{IV}O_2$, $Me^{V}_2O_5$ and $Me^{VI}O_3$ have the meanings given above.

In another particularly preferred embodiment, the glass ceramic comprises at least one, and preferably all, of the following components in the amounts indicated:

| Component | Wt.-% |
|---|---|
| $SiO_2$ | 73.1 to 80.0 |
| $Li_2O$ | 7.0 to 12.9 |
| $Al_2O_3$ | 4.0 to 10.0 |
| $P_2O_5$ | 1.2 to 2.6 |
| $Na_2O$ | 0 to 2.0 |
| $K_2O$ | 0 to 10.0 |
| $Rb_2O$ | 0 to 13.0 |
| $Cs_2O$ | 0 to 13.0 |

-continued

| Component | Wt.-% |
|---|---|
| MgO | 0 to 4.0 |
| CaO | 0 to 4.0 |
| SrO | 0 to 7.0 |
| ZnO | 0 to 5.0 |
| $B_2O_3$ | 0 to 4.0 |
| $Y_2O_3$ | 0 to 5.0 |
| $La_2O_3$ | 0 to 5.0 |
| $Ga_2O_3$ | 0 to 3.0 |
| $In_2O_3$ | 0 to 5.0 |
| $TiO_2$ | 0 to 4.0 |
| $ZrO_2$ | 0 to 3.0 |
| $GeO_2$ | 0 to 9.0 |
| $SnO_2$ | 0 to 3.0 |
| $CeO_2$ | 0 to 4.0 |
| $V_2O_5$ | 0 to 2.0 |
| $Nb_2O_5$ | 0 to 5.0 |
| $Ta_2O_5$ | 0 to 5.0 |
| $MoO_3$ | 0 to 3.0 |
| $WO_3$ | 0 to 3.0 |
| Fluorine | 0 to 1.0. |

Some of the above components may serve as colorants and/or fluorescent agents. The glass ceramic according to the invention may further comprise additional coloring and/or fluorescent agents.—These may be selected, for example, from $Bi_2O_3$ or $Bi_2O_5$ and in particular from further inorganic pigments and/or oxides of d and f elements, such as the oxides of Mn, Fe, Co, Pr, Nd, Tb, Er, Dy, Eu and Yb. By means of these coloring and fluorescent agents, it is possible to easily color the glass ceramic in order to imitate the desired optical properties, in particular of natural dental material.

In a preferred embodiment of the glass ceramic, the molar ratio of $SiO_2$ to $Li_2O$ is in the range of 2.9 to 4.6, and preferably in the range of 3.3 to 4.4. It is surprising that despite these high molar excesses of $SiO_2$ relative to $Li_2O$, the glass ceramics of the invention can be formed with lithium metasilicate as the main crystalline phase.

Preferably, the glass ceramic according to the invention comprises no more than 30 wt.-%, preferably no more than 28 wt.-%, particularly preferably no more than 26 wt.-% and most preferably no more than 22 wt.-% of lithium metasilicate crystals. Particularly preferably, the glass ceramic comprises 10 to 30 wt.-%, preferably 12 to 28 wt.-%, more preferably 15 to 26 wt.-% and most preferably 18 to 22 wt.-% of lithium metasilicate crystals.

It is further preferred that in the glass ceramic according to the invention the average size of the lithium metasilicate crystals is in the range of 5 to 80 nm, in particular in the range of 10 to 50 nm, preferably in the range of 15 to 45 nm and particularly preferably in the range of 25 to 35 nm.

The average size of the lithium metasilicate crystals can be determined in particular by X-ray diffraction on a powder of the glass ceramic with CuKα radiation. For this purpose, the X-ray diffraction pattern obtained can be evaluated according to the Rietveld method and the average size of the lithium metasilicate crystals can be calculated from the half-value width of the peaks of lithium metasilicate according to the Scherrer equation. This evaluation can preferably be carried out with software support, for example with the TOPAS 5.0 software from Bruker.

In addition to lithium metasilicate, the glass ceramic according to the invention may comprise further crystal phases, such as quartz, in particular low quartz, apatite, caesium aluminosilicate and in particular lithium phosphate. However, the amount of cristobalite should be as small as possible and, in particular less than 1.0 wt.-%. It is particularly preferred that the glass ceramic according to the invention is substantially free of cristobalite.

The type and in particular the amount of crystal phases formed can be controlled by the composition of the starting glass and the heat treatment applied to produce the glass ceramic from the starting glass. The examples illustrate this by varying the composition of the starting glass and the heat treatment applied.

The glass ceramic has a biaxial fracture strength of preferably at least 80 MPa and particularly preferably 100 to 200 MPa. The biaxial fracture strength was determined in accordance with ISO 6872 (2008) (piston-on-three-balls test).

The glass ceramic according to the invention has a coefficient of thermal expansion CTE (measured in the range from 100 to 500° C.) of preferably 9.5 to $14.0 \cdot 10^{-6} \, K^{-1}$. The CTE is determined in accordance with ISO 6872 (2008). The coefficient of thermal expansion is adjusted to a desired value in particular by the type and amount of the crystal phases present in the glass ceramic and the chemical composition of the glass ceramic.

The translucency of the glass ceramic was determined in terms of the contrast value (CR value) according to British Standard BS 5612, and this contrast value was preferably 40 to 92.

The invention also relates to various precursors of corresponding composition from which the lithium silicate glass ceramic according to the invention can be produced by heat treatment. These precursors are a correspondingly composed starting glass and a correspondingly composed starting glass with nuclei. The term "corresponding composition" means that these precursors comprise the same components in the same amounts as the glass ceramic, wherein the components are calculated as oxides with the exception of fluorine, as is usual for glasses and glass ceramics.

The invention therefore also relates to a starting glass comprising the components of the lithium silicate glass ceramic according to the invention.

The starting glass according to the invention therefore comprises in particular suitable amounts of $SiO_2$, $Li_2O$, $Me^L_2O$, $Al_2O_3$ and $P_2O_5$ which are required for forming the glass ceramic according to the invention with lithium metasilicate as the main crystal phase. Further, the starting glass may also comprise other components as indicated above for the lithium silicate glass ceramic according to the invention. All such embodiments are preferred for the components of the starting glass which are also indicated as preferred for the components of the lithium silicate glass ceramic according to the invention.

The invention also relates to such a starting glass comprising nuclei for the formation of lithium metasilicate crystals.

The lithium silicate glass ceramic according to the invention and the starting glass according to the invention are present in particular in the form of powders, granules or blanks of any shape and size, for example monolithic blanks, such as platelets, cuboids or cylinders, or powder compacts, in unsintered, partially sintered or densely sintered form. In these forms they can be easily further processed. However, they can also be in the form of dental restorations, such as inlays, onlays, crowns, veneers, facets or abutments.

For the preparation of the starting glass, the procedure is in particular such that a mixture of suitable starting materials, such as carbonates, oxides, phosphates and fluorides, is melted at temperatures of in particular 1300 to 1600° C. for 2 to 10 h. To achieve a particularly high homogeneity, the glass melt obtained is poured into water to form a glass granulate, and the granulate obtained is then again melted.

The melt can then be poured into moulds to produce blanks of the starting glass, so-called solid glass blanks or monolithic blanks.

It is also possible to again introduce the melt into water to produce a granulate. After grinding and, if necessary, adding further components, such as colouring and fluorescent agents, this granulate can be pressed into a blank, a so-called powder compact.

Finally, the starting glass can also be processed into a powder after granulation.

Subsequently, the starting glass, for example in the form of a solid glass blank, a powder compact or in the form of a powder, is subjected to at least one heat treatment. It is preferred that initially a first heat treatment is carried out to produce the starting glass according to the invention with nuclei for the formation of lithium metasilicate crystals. The starting glass with nuclei is then typically subjected to at least one further heat treatment at a higher temperature to effect crystallization of lithium metasilicate and prepare the lithium silicate glass ceramic according to the invention.

The invention thus also relates to a process for preparing the lithium silicate glass ceramic according to the invention, in which the starting glass or the starting glass with nuclei is subjected to at least one heat treatment at a temperature of 450 to 750° C. for a duration of in particular 1 to 120 min, preferably 5 to 120 min and particularly preferably 10 to 60 min.

The at least one heat treatment carried out in the process according to the invention may also be carried out in the course of hot pressing or sintering of the starting glass according to the invention or of the starting glass with nuclei according to the invention.

It is preferred to subject the starting glass to a heat treatment at a temperature of 450 to 600° C., preferably 480 to 580° C. and particularly preferably 480 to 520° C., for a duration of in particular 1 to 120 min, preferably 10 to 60 min, in order to produce the starting glass with nuclei for the crystallization of lithium metasilicate.

It is further preferred to subject the starting glass with nuclei to a heat treatment at a temperature of 550 to 750° C., preferably 580 to 700° C. and particularly preferably 590 to 630° C., for a duration of in particular 1 to 120 min, preferably 5 to 60 min and particularly preferably 10 to 30 min, in order to produce the lithium silicate glass ceramic.

In a preferred embodiment, the process for preparing the lithium silicate glass ceramic according to the invention thus comprises that (a) the starting glass is subjected to a heat treatment at a temperature of 450 to 600° C., preferably 480 to 580° C. and particularly preferably 480 to 520° C., for a duration of in particular 1 to 120 min, preferably 10 to 60 min, in order to form starting glass with nuclei, and (b) the starting glass with nuclei is subjected to a heat treatment at a temperature of 550 to 750° C., preferably 580 to 700° C. and particularly preferably 590 to 630° C., for a duration of in particular 1 to 120 min, preferably 5 to 60 min and particularly preferably 10 to 30 min, in order to form the glass ceramic.

Due to the above-described properties of the glass ceramics according to the invention and the glasses according to the invention, they are particularly suitable for use in dentistry. The object of the invention is therefore also the use of the glass ceramics according to the invention or the glasses according to the invention as dental material and in particular for the preparation of dental restorations or as coating material for dental restorations.

In particular, the glass ceramics according to the invention and the glasses according to the invention can be used to prepare dental restorations, such as bridges, inlays, onlays, veneers, abutments, partial crowns, crowns or facets. The invention therefore also relates to the use of the glass ceramics according to the invention or the glasses according to the invention for the preparation of dental restorations. In this context, it is preferred that the glass ceramic or the glass is given the shape of the desired dental restoration by pressing or machining.

The invention also relates to a process for preparing dental restorations, in which the glass ceramics according to the invention or the glasses according to the invention are given the shape of the desired dental restoration by pressing or machining.

The pressing is usually carried out at increased pressure and increased temperature. It is preferred that the pressing is performed at a temperature of 700 to 1200° C. It is further preferred that the pressing is carried out at a pressure of 2 to 10 bar. During the pressing, the desired change in shape is achieved by viscous flow of the material used. The starting glass according to the invention, and in particular the starting glass with nuclei according to the invention, and the lithium silicate glass ceramic according to the invention can be used for the pressing. The glasses and glass ceramics according to the invention can be used in particular in the form of blanks of any shape and size, for example solid blanks or powder compacts, for example in unsintered, partially sintered or densely sintered form.

The machining is usually performed by material-removing processes and in particular by milling and/or grinding. It is particularly preferred that the machining is carried out as part of a CAD/CAM process. The starting glass according to the invention, the starting glass with nuclei according to the invention and the lithium silicate glass ceramic according to the invention can be used for the machining. The glasses and glass ceramics according to the invention can be used in particular in the form of blanks, for example solid blanks or powder compacts, for example in unsintered, partially sintered or densely sintered form. Preferably, the lithium silicate glass ceramic according to the invention is used for machining.

It has been surprisingly shown that the lithium silicate glass ceramics according to the invention can be machined faster than known lithium silicate glass ceramics at the application of the same force. To describe this property, in particular the removal rate on sample bodies of the glass ceramics can be determined. For this purpose, platelets are sawn off the sample bodies and weighed. The platelets are then glued to a holder and ground under water cooling with an automatic grinding machine, such as those available from the company Struers, using a diamond grinding wheel, for example with a grain size of 20 μm. The pressure of the grinding machine is selected so that the same force, for example 15 N, is applied to each platelet. After the platelets have been ground for 1 min, they are dried and weighed again. The removal rate is then calculated according to the following formula:

$$\text{Removal rate } [\text{wt.-\%}\cdot\text{min}^{-1}] = 100 \times (1 - (m_{ground} : m_{unground}))$$

It has further been shown that the easily machinable lithium silicate glass ceramic with lithium metasilicate as the main crystal phase can be converted to a glass ceramic with lithium disilicate as the main crystal phase by further heat treatment. This glass ceramic not only exhibits excellent mechanical properties such as high strength, but also exhibits other properties required for a dental restoration material.

After the glass ceramic has obtained the shape of the desired dental restoration, it can thus be subjected to a further heat treatment in order to convert lithium metasilicate crystals into lithium disilicate crystals. Preferably, the glass ceramic is subjected to a heat treatment at a temperature of 750 to 950° C., preferably 820 to 890° C. and particularly preferably 840 to 870° C., in particular for a duration of 1 to 60 minutes, preferably 5 to 30 minutes, more preferably 5 to 15 minutes and even more preferably 5 to 10 minutes. The suitable conditions for a given glass ceramic can be determined for example by performing X-ray diffraction analyses at different temperatures.

It has also been shown that the transformation to a lithium disilicate glass ceramic is only associated with a very small linear shrinkage of only about 0.2 to 0.3%, which is almost negligible compared to a linear shrinkage of up to 30% when sintering ceramics.

However, the glass ceramics according to the invention and the glasses according to the invention are also suitable as coating material of for example ceramics and glass ceramics. The invention is therefore also directed to the use of the glasses according to the invention or the glass ceramics according to the invention for coating ceramics, glass ceramics and in particular dental restorations.

The invention also relates to a process for coating ceramics, metals, metal alloys and glass ceramics, in which glass ceramic or glass according to the invention is applied to the ceramic or glass ceramic and subjected to increased temperature.

This can be performed in particular by sintering on or by joining an overlay produced by means of CAD-CAM with a suitable glass solder or adhesive and preferably by pressing on. In the case of sintering on, the glass ceramic or the glass is applied in the usual manner, for example as a powder, to the material to be coated, such as ceramic or glass ceramic, and then sintered at increased temperature. In the preferred pressing-on process, glass ceramic or glass according to the invention, for example in the form of powder compacts or monolithic blanks, is pressed on at an increased temperature of, for example 700 to 1200° C., and with the application of pressure, for example 2 to 10 bar. In particular, the processes described in EP 231 773 and the pressing furnace disclosed therein can be used for this purpose. A suitable furnace is for example the Programat EP 5000 from Ivoclar Vivadent AG, Liechtenstein.

It is preferred that, after the coating process has been completed, a glass ceramic with lithium silicate, in particular lithium disilicate as the main crystalline phase, is present since such a glass ceramic has particularly good properties.

The invention will be explained in more detail below with reference to non-limiting examples.

EXAMPLES

A total of 28 glasses according to the invention and a comparative example with the compositions given in Table I were prepared. The glasses were crystallized into glass ceramics according to Table II. The followings meanings apply $T_g$ Glass transition temperature, determined by means of DSC $T_S$ and $t_S$ temperature and time applied for melting $T_{Kb}$ and $t_{Kb}$ temperature and time applied for nucleation $T_{c1}$ and $t_{c1}$ temperature and time applied for 1st crystallization $T_{c2}$ and $t_{c2}$ temperature and time applied for 2nd crystallization In the examples, starting glasses with the compositions given in Table I were first melted on a 100 to 200 g scale from common raw materials at the temperature $T_s$ for the duration $t_s$, the melting being very well possible without the formation of bubbles or streaks. Glass frits were prepared by pouring the starting glasses into water, which were then melted a second time at 1500° C. or 1400° C. for 1 hour for homogenization. The resulting melts of the starting glass were then poured into a graphite mould to produce solid glass blocks.

A first heat treatment of the obtained glass monoliths at temperature $T_{Kb}$ for duration $t_{Kb}$ resulted in the formation of glasses with nuclei. These nucleated glasses crystallized by further heat treatment at temperature $T_{c1}$ for duration $t_{c1}$ to form glass ceramics with lithium metasilicate as the main crystal phase, as determined by X-ray diffraction analyses at room temperature.

The amounts of the crystal phases and the average size of the lithium metasilicate crystals were determined by X-ray diffraction. For this purpose, powders of the respective glass ceramics were prepared by grinding and sieving (<45 μm) and mixed with $Al_2O_3$ (Alfa Aesar, product no. 42571) as internal standard in a ratio of 80 wt.-% glass ceramic to 20 wt.-% $Al_2O_3$. This mixture was slurried with acetone to achieve the best possible mixing. The mixture was then dried at about 80° C. A diffractogram was then recorded using a Bruker D8 Advance diffractometer in the range 10 to 100° 2θ using CuKα radiation and a step size of 0.014° 2θ. This diffractogram was then analyzed using Bruker's TOPAS 5.0 software according to the Rietveld method. By comparing the intensities of the peaks of lithium metasilicate and $Al_2O_3$, respectively, the phase fractions were determined. The mean size of the lithium metasilicate crystals was determined from the half-width of the lithium metasilicate peaks according to the Scherrer equation.

In order to determine the machinability of the glass ceramic blocks obtained in this way, two platelets each with an area of 170 mm²±10 mm² (about 12.5 mm×13.8 mm) and a thickness of 4.0±0.5 mm were sawn off and weighed on a precision balance. The platelets were then glued onto a holder and ground under water cooling with an automatic grinding machine (LaboForche-100, Struers) using a diamond grinding wheel with a grain size of 20 μm. The pressure of the grinding machine was selected in such a way that a force of 15 N was applied to each plate. The turntable, on which the diamond grinding wheel was mounted, and the head of the grinding machine, on which the holder with the specimens was mounted, had the same direction of rotation. The speed of the turntable was 300 revolutions min⁻¹. The platelets were ground for 1 min and then dried and reweighed. The removal rate was calculated according to the following formula:

$$\text{Removal rate } [\text{wt.-\%}\cdot\text{min}^{-1}] = 100 \times (1 - (m_{ground} : m_{unground}))$$

As can be seen from Table II, the removal rates in Examples 1 to 28 according to the invention were consistently higher than in the comparative example. This shows that the lithium silicate glass ceramics according to the invention can be machined faster at the application of the same force than known lithium silicate glass ceramics.

The remaining glass ceramic blocks were subjected to further heat treatment at temperature $T_{c2}$ for duration $t_{c2}$. This resulted in the formation of glass ceramics with lithium disilicate as the main phase. Lithium phosphate and, in the case of Example 27, lithium strontium phosphate were found as minor phases.

TABLE I

| | Example | | | | | | | | | |
|---|---|---|---|---|---|---|---|---|---|---|
| Composition | 1 wt.-% | 2 wt.-% | 3 wt.-% | 4 wt.-% | 5 wt.-% | 6 wt.-% | 7 wt.-% | 8 wt.-% | 9 wt.-% | 10 wt.-% |
| $SiO_2$ | 75.9 | 77.1 | 76.9 | 76.6 | 76.9 | 77.3 | 77.6 | 77.8 | 78.2 | 75.3 |
| $Li_2O$ | 11.5 | 10.4 | 10.3 | 10.3 | 10.1 | 9.8 | 9.6 | 9.2 | 8.8 | 10.7 |
| $Na_2O$ | — | — | — | — | — | — | — | — | — | — |
| $K_2O$ | 5.5 | 4.7 | 5.6 | 5.8 | 5.8 | 5.8 | 5.8 | 5.9 | 6.0 | 5.5 |
| $Rb_2O$ | — | — | — | — | — | — | — | — | — | — |
| MgO | — | — | — | — | — | — | — | — | — | — |
| CaO | — | — | — | — | — | — | — | — | — | — |
| SrO | — | — | — | — | — | — | — | — | — | — |
| ZnO | — | — | — | — | — | — | — | — | — | — |
| $Al_2O_3$ | 4.6 | 5.5 | 4.9 | 5.0 | 5.0 | 5.0 | 5.0 | 5.3 | 5.3 | 4.8 |
| $Y_2O_3$ | — | — | — | — | — | — | — | — | — | — |
| $La_2O_3$ | — | — | — | — | — | — | — | — | — | — |
| $TiO_2$ | — | — | — | — | — | — | — | — | — | — |
| $ZrO_2$ | — | — | — | — | — | — | — | — | — | — |
| $CeO_2$ | — | — | — | — | — | — | — | — | — | — |
| $P_2O_5$ | 2.5 | 2.3 | 2.3 | 2.3 | 2.2 | 2.1 | 2.0 | 1.8 | 1.7 | 2.3 |
| $V_2O_5$ | — | — | — | — | — | — | — | — | — | — |
| $Ta_2O_5$ | — | — | — | — | — | — | — | — | — | 1.4 |
| $Er_2O_3$ | — | — | — | — | — | — | — | — | — | — |
| $Tb_4O_7$ | — | — | — | — | — | — | — | — | — | — |
| $\Sigma$ | 100.0 | 100.0 | 100.0 | 100.0 | 100.0 | 100.0 | 100.0 | 100.0 | 100.0 | 100.0 |

| | Example | | | | | | | | | |
|---|---|---|---|---|---|---|---|---|---|---|
| Composition | 11 wt.-% | 12 wt.-% | 13 wt.-% | 14 wt.-% | 15 wt.-% | 16 wt.-% | 17 wt.-% | 18 wt.-% | 19 wt.-% | 20 wt.-% |
| $SiO_2$ | 74.9 | 74.9 | 76.4 | 75.5 | 74.6 | 74.8 | 77.5 | 76.9 | 76.2 | 74.0 |
| $Li_2O$ | 10.3 | 11.0 | 9.7 | 9.6 | 9.5 | 9.5 | 8.4 | 10.1 | 9.0 | 9.2 |
| $Na_2O$ | — | — | — | — | — | — | — | 0.8 | — | — |
| $K_2O$ | 5.5 | 5.5 | 6.8 | 7.8 | 8.8 | 6.8 | 6.4 | 5.0 | 5.9 | 5.8 |
| $Rb_2O$ | — | — | — | — | — | — | — | — | — | — |
| MgO | — | — | — | — | — | — | — | — | — | — |
| CaO | — | — | — | — | — | — | — | — | — | — |
| SrO | — | — | — | — | — | — | — | — | — | — |
| ZnO | — | — | — | — | — | — | — | — | — | — |
| $Al_2O_3$ | 4.8 | 4.7 | 5.0 | 5.0 | 5.0 | 6.8 | 6.1 | 5.0 | 5.3 | 5.0 |
| $Y_2O_3$ | — | 1.4 | — | — | — | — | — | — | — | — |
| $La_2O_3$ | 2.1 | — | — | — | — | — | — | — | — | — |
| $TiO_2$ | — | — | — | — | — | — | — | — | 0.6 | — |
| $ZrO_2$ | — | — | — | — | — | — | — | — | — | 4.0 |
| $CeO_2$ | — | — | — | — | — | — | — | — | 1.2 | — |
| $P_2O_5$ | 2.4 | 2.5 | 2.1 | 2.1 | 2.1 | 2.1 | 1.6 | 2.2 | 1.8 | 2.0 |
| $V_2O_5$ | — | — | — | — | — | — | — | — | — | — |
| $Ta_2O_5$ | — | — | — | — | — | — | — | — | — | — |
| $Er_2O_3$ | — | — | — | — | — | — | — | — | — | — |
| $Tb_4O_7$ | — | — | — | — | — | — | — | — | — | — |
| $\Sigma$ | 100.0 | 100.0 | 100.0 | 100.0 | 100.0 | 100.0 | 100.0 | 100.0 | 100.0 | 100.0 |

| | Example | | | | | | | | |
|---|---|---|---|---|---|---|---|---|---|
| Composition | 21 wt.-% | 22 wt.-% | 23 wt.-% | 24 wt.-% | 25 wt.-% | 26 wt.-% | 27 wt.-% | 28 wt.-% | V* wt.-% |
| $SiO_2$ | 75.4 | 73.1 | 74.3 | 74.5 | 75.5 | 76.3 | 74.4 | 75.1 | 71.7 |
| $Li_2O$ | 8.9 | 7.9 | 9.7 | 9.7 | 9.6 | 8.2 | 9.3 | 12.9 | 14.9 |
| $Na_2O$ | — | — | 0.8 | — | — | — | — | — | — |
| $K_2O$ | 2.9 | — | 4.8 | 5.8 | 5.8 | 6.4 | 5.8 | 5.5 | 4.0 |
| $Rb_2O$ | 5.6 | 12.0 | 3.2 | — | — | — | — | — | — |
| MgO | — | — | — | — | — | 1.4 | — | — | — |
| CaO | — | — | — | — | 2 | — | — | — | — |
| SrO | — | — | — | — | — | — | 3.5 | — | — |
| ZnO | — | — | — | 2.8 | — | — | — | — | — |
| $Al_2O_3$ | 5.3 | 5.4 | 5.0 | 5.0 | 5.0 | 6.1 | 5.0 | 3.6 | 3.3 |
| $Y_2O_3$ | — | — | — | — | — | — | — | — | — |
| $La_2O_3$ | — | — | — | — | — | — | — | — | — |
| $TiO_2$ | — | — | — | — | — | — | — | — | — |
| $ZrO_2$ | — | — | — | — | — | — | — | — | 0.4 |

TABLE I-continued

| CeO$_2$ | — | — | — | — | — | — | — | — | 1.8 |
|---|---|---|---|---|---|---|---|---|---|
| P$_2$O$_5$ | 1.9 | 1.6 | 2.2 | 2.2 | 2.1 | 1.6 | 2.0 | 2.9 | 3.2 |
| V$_2$O$_5$ | — | — | — | — | — | — | — | — | 0.1 |
| Ta$_2$O$_5$ | — | — | — | — | — | — | — | — | — |
| Er$_2$O$_3$ | — | — | — | — | — | — | — | — | 0.1 |
| Tb$_4$O$_7$ | — | — | — | — | — | — | — | — | 0.5 |
| Σ | 100.0 | 100.0 | 100.0 | 100.0 | 100.0 | 100.0 | 100.0 | 100.0 | 100.0 |

*Comparison

TABLE II

| Example | 1 | 2 | 3 | 4 | 5 |
|---|---|---|---|---|---|
| T$_g$ [° C.] | 477 | 474 | 476 | 475 | 481 |
| T$_S$ [° C.] | 1550 | 1500 | 1500 | 1500 | 1550 |
| t$_S$ [min] | 60 | 60 | 60 | 60 | 60 |
| T$_{Kb}$ [° C.] | 500 | 500 | 500 | 500 | 500 |
| t$_{Kb}$ [min] | 10 | 10 | 10 | 10 | 10 |
| T$_{C1}$ [° C.] | 610 | 590 | 600 | 580 | 590 |
| t$_{C1}$ [min] | 30 | 20 | 5 | 30 | 10 |
| Main crystal phase | Li$_2$SiO$_3$ | Li$_2$SiO$_3$ | Li$_2$SiO$_3$ | Li$_2$SiO$_3$ | Li$_2$SiO$_3$ |
| Phase proportion [wt.-%] | | | | | |
| Crystal size [nm] | | | | | |
| Removal rate [wt.-% · min$^{-1}$] | 52.4 | 50.6 | 47.2 | 44.2 | 50.4 |
| T$_{C2}$ [° C.] | 840 | 850 | 850 | 850 | 850 |
| t$_{C2}$ [min] | 7 | 7 | 7 | 7 | 7 |
| Crystal phase(s) | Li$_2$Si$_2$O$_5$Li$_3$PO$_4$ | Li$_2$Si$_2$O$_5$Li$_3$PO$_4$ | Li$_2$Si$_2$O$_5$Li$_3$PO$_4$ | Li$_2$Si$_2$O$_5$Li$_3$PO$_4$ | Li$_2$Si$_2$O$_5$Li$_3$PO$_4$ |

| Example | 6 | 7 | 8 | 9 | 10 |
|---|---|---|---|---|---|
| T$_g$ [° C.] | 477 | 479 | 486 | 486 | 478 |
| T$_S$ [° C.] | 1550 | 1550 | 1600 | 1600 | 1600 |
| t$_S$ [min] | 60 | 60 | 60 | 60 | 60 |
| T$_{Kb}$ [° C.] | 500 | 500 | 500 | 500 | 500 |
| t$_{Kb}$ [min] | 10 | 10 | 10 | 10 | 10 |
| T$_{C1}$ [° C.] | 580 | 600 | 610 | 600 | 700 |
| t$_{C1}$ [min] | 30 | 10 | 50 | 10 | 30 |
| Main crystal phase | Li$_2$SiO$_3$ | Li$_2$SiO$_3$ | Li$_2$SiO$_3$ | Li$_2$SiO$_3$ | Li$_2$SiO$_3$ |
| Phase proportion [wt.-%] | | | 20 | | |
| Crystal size [nm] | | | 31 | | |
| Removal rate [wt.-% · min$^{-1}$] | 42.6 | 44.9 | 41.4 | 45.1 | 47.6 |
| T$_{C2}$ [° C.] | 850 | 850 | 850 | 850 | 850 |
| t$_{C2}$ [min] | 7 | 7 | 7 | 7 | 7 |
| Crystal phase(s) | Li$_2$Si$_2$O$_5$Li$_3$PO$_4$ | Li$_2$Si$_2$O$_5$Li$_3$PO$_4$ | Li$_2$Si$_2$O$_5$Li$_3$PO$_4$ | Li$_2$Si$_2$O$_5$Li$_3$PO$_4$ | Li$_2$Si$_2$O$_5$Li$_3$PO$_4$ |

| Example | 11 | 12 | 13 | 14 | 15 |
|---|---|---|---|---|---|
| T$_g$ [° C.] | 483 | 476 | 472 | 477 | 473 |
| T$_S$ [° C.] | 1500 | 1500 | 1550 | 1550 | 1550 |
| t$_S$ [min] | 60 | 60 | 60 | 60 | 60 |
| T$_{Kb}$ [° C.] | 500 | 500 | 500 | 500 | 500 |

TABLE II-continued

| | | | | | |
|---|---|---|---|---|---|
| $t_{Kb}$ [min] | 10 | 10 | 10 | 10 | 10 |
| $T_{C1}$ [° C.] | 620 | 620 | 630 | 590 | 630 |
| $t_{C1}$ [min] | 30 | 30 | 30 | 10 | 30 |
| Main crystal phase | $Li_2SiO_3$ | $Li_2SiO_3$ | $Li_2SiO_3$ | $Li_2SiO_3$ | $Li_2SiO_3$ |
| Phase proportion [wt.-%] | | | | | 19 |
| Crystal size [nm] | | | | | 37 |
| Removal rate [wt.-% · $min^{-1}$] | 44.4 | 41.8 | 47.0 | 48.8 | 38.8 |
| $T_{C2}$ [° C.] | 840 | 840 | 840 | 840 | 840 |
| $t_{C2}$ [min] | 7 | 7 | 7 | 7 | 7 |
| Crystal phase(s) | $Li_2Si_2O_5 Li_3PO_4$ | $Li_2Si_2O_5 Li_3PO_4$ | $Li_2Si_2O_5 Li_3PO_4$ | $Li_2Si_2O_5 Li_3PO_4$ | $Li_2Si_2O_5 Li_3PO_4$ |

| Example | 16 | 17 | 18 | 19 | 20 |
|---|---|---|---|---|---|
| $T_g$ [° C.] | 482 | 488 | 474 | 491 | 501 |
| $T_S$ [° C.] | 1550 | 1600 | 1600 | 1500 | 1550 |
| $t_S$ [min] | 60 | 60 | 60 | 60 | 60 |
| $T_{Kb}$ [° C.] | 500 | 500 | 500 | 500 | 500 |
| $t_{Kb}$ [min] | 10 | 10 | 10 | 10 | 10 |
| $T_{C1}$ [° C.] | 610 | 610 | 630 | 630 | 650 |
| $t_{C1}$ [min] | 30 | 10 | 30 | 30 | 20 |
| Main crystal phase | $Li_2SiO_3$ | $Li_2SiO_3$ | $Li_2SiO_3$ | $Li_2SiO_3$ | $Li_2SiO_3$ |
| Phase proportion [wt.-%] | 20 | 16 | | 19 | |
| Crystal size [nm] | 24 | 26 | | 27 | |
| Removal rate [wt.-% · $min^{-1}$] | 45.4 | 43.7 | 38.5 | 55.7 | 49.7 |
| $T_{C2}$ [° C.] | 860 | 860 | 840 | 840 | 850 |
| $t_{C2}$ [min] | 7 | 7 | 7 | 7 | 7 |
| Crystal phase(s) | $Li_2Si_2O_5 Li_3PO_4$ | $Li_2Si_2O_5 Li_3PO_4$ | $Li_2Si_2O_5 Li_3PO_4$ | $Li_2Si_2O_5 Li_3PO_4$ | $Li_2Si_2O_5 Li_3PO_4$ |

| Example | 21 | 22 | 23 | 24 | 25 |
|---|---|---|---|---|---|
| $T_g$ [° C.] | 490 | 497 | 472 | 474 | 479 |
| $T_S$ [° C.] | 1500 | 1500 | 1500 | 1500 | 1500 |
| $t_S$ [min] | 60 | 60 | 60 | 60 | 60 |
| $T_{Kb}$ [° C.] | 510 | 490 | 530 | 520 | 500 |
| $t_{Kb}$ [min] | 30 | 50 | 10 | 3 | 10 |
| $T_{C1}$ [° C.] | 630 | 600 | 620 | 600 | 630 |
| $t_{C1}$ [min] | 30 | 30 | 30 | 30 | 30 |
| Main crystal phase | $Li_2SiO_3$ | $Li_2SiO_3$ | $Li_2SiO_3$ | $Li_2SiO_3$ | $Li_2SiO_3$ |
| Phase proportion [wt.-%] | 20 | 15 | 19 | 22 | 22 |
| Crystal size [nm] | 24 | 24 | 34 | 12 | 38 |
| Removal rate [wt.-% · $min^{-1}$] | 44.9 | 44.9 | 45.1 | 47.1 | 45.3 |
| $T_{C2}$ [° C.] | 870 | 890 | 840 | 840 | 830 |
| $t_{C2}$ [min] | 7 | 7 | 7 | 7 | 7 |
| Crystal phase(s) | $Li_2Si_2O_5 Li_3PO_4$ | $Li_2Si_2O_5 Li_3PO_4$ | $Li_2Si_2O_5 Li_3PO_4$ | $Li_2Si_2O_5 Li_3PO_4$ | $Li_2Si_2O_5 Li_3PO_4$ |

| Example | 26 | 27 | 28 | V* |
|---|---|---|---|---|
| $T_g$ [° C.] | 485 | 475 | 469 | |
| $T_S$ [° C.] | 1550 | 1500 | 1500 | |
| $t_S$ [min] | 60 | 60 | 60 | |
| $T_{Kb}$ [° C.] | 480 | 520 | 580 | 500 |
| $t_{Kb}$ [min] | 60 | 20 | 40 | 10 |
| $T_{C1}$ [° C.] | 630 | 620 | 590 | 680 |

TABLE II-continued

| | | | | |
|---|---|---|---|---|
| $t_{C1}$ [min] | 30 | 30 | 20 | 20 |
| Main crystal phase | $Li_2SiO_3$ | $Li_2SiO_3$ | $Li_2SiO_3$ | $Li_2SiO_3$ |
| Phase proportion [wt.-%] | 18 | 22 | 26 | 34 |
| Crystal size [nm] | 26 | 34 | 45 | 46 |
| Removal rate [wt.-% · min$^{-1}$] | 51.2 | 61.9 | 45.2 | 36.6 |
| $T_{C2}$ [° C.] | 840 | 820 | 850 | 850 |
| $t_{C2}$ [min] | 7 | 7 | 15 | 7 |
| Crystal phase(s) | $Li_2Si_2O_5Li_3PO_4$ | $Li_2Si_2O_5LiSrPO_4Li_3PO_4$ | $Li_2Si_2O_5Li_3PO_4$ | $Li_2Si_2O_5Li_3PO_4$ |

*comparison

The invention claimed is:

1. A lithium silicate glass ceramic, which comprises lithium metasilicate as main crystal phase and comprises the following components in the amounts indicated:

| Component | Wt.-% |
|---|---|
| $SiO_2$ | 73.1 to 80.0 |
| $Li_2O$ | 6.0 to 14.0 |
| $Me^I_2O$ | 5.1 to 15.0 |
| $Al_2O_3$ | 2.0 to 10.0 |
| $P_2O_5$ | 0.5 to 7.0, | wherein $Me^I_2O$ is selected from $Na_2O$, $K_2O$, $Rb_2O$, $Cs_2O$ and mixtures thereof, wherein the glass ceramic comprises 5.1 to 10.0 wt.-% $K_2O$, and wherein the molar ratio of $SiO_2$ to $Li_2O$ is in the range of 2.9 to 5.0.

2. The glass ceramic according to claim 1, which comprises 74.0 to 78.0 wt.-% $SiO_2$.

3. The glass ceramic according to claim 1, which comprises 7.0 to 12.9 wt.-% $Li_2O$.

4. The glass ceramic according to claim 1, which comprises 5.1 to 9.0 wt.-% $K_2O$.

5. The glass ceramic according to claim 1, which comprises 4.0 to 7.0 wt.-% $Al_2O_3$.

6. The glass ceramic according to claim 1, which comprises 1.0 to 4.0 wt.-% $P_2O_5$.

7. The glass ceramic according to claim 1, which comprises at least one of the following components in the amounts indicated:

| Component | Wt.-% |
|---|---|
| $Li_2O$ | 7.0 to 12.9 |
| $Al_2O_3$ | 4.0 to 10.0 |
| $P_2O_5$ | 1.2 to 2.6 |
| $Me^{II}O$ | 0 to 9.0 |
| $Me^{III}_2O_3$ | 0 to 8.0 |
| $Me^{IV}O_2$ | 0 to 10.0 |
| $Me^V_2O_5$ | 0 to 8.0 |
| $Me^{VI}O_3$ | 0 to 5.0 |
| Fluorine | 0 to 1.0, | wherein
$Me^{II}O$ is selected from MgO, CaO, SrO, ZnO and mixtures thereof, $Me^{III}_2O_3$ is selected from $B_2O_3$, $Y_2O_3$, $La_2O_3$, $Ga_2O_3$, $In_2O_3$ and mixtures thereof, $Me^{IV}O_2$ is selected from $TiO_2$, $ZrO_2$, $GeO_2$, $SnO_2$, $CeO_2$ and mixtures thereof, $Me^V_2O_5$ is selected from $V_2O_5$, $Nb_2O_5$, $Ta_2O_5$ and mixtures thereof; and $Me^{VI}O_3$ is selected from $MoO_3$, $WO_3$ and mixtures thereof.

8. The glass ceramic according to claim 1, wherein the molar ratio of $SiO_2$ to $Li_2O$ is in the range of 3.3 to 5.0.

9. The glass ceramic according to claim 1, which comprises not more than 30 wt. % of lithium metasilicate crystals.

10. The glass ceramic according to claim 1, wherein the average size of the lithium metasilicate crystals is in the range of 5 to 80 nm.

11. A starting glass, which comprises the components of the glass ceramic according to claim 1, and comprises nuclei for the formation of lithium metasilicate crystals.

12. The glass ceramic according to claim 1, wherein the glass ceramic is in the form of a powder, a granulate, a blank or a dental restoration.

13. A process for the preparation of the glass ceramic according to claim 1, wherein a starting glass is subjected to at least one heat treatment in the range of 450 to 750° C.

14. The process according to claim 13, in which
(a) the starting glass is subjected to a heat treatment at a temperature of 450 to 600° C. to form a starting glass with nuclei, and
(b) the starting glass with nuclei is subjected to a heat treatment at a temperature of 550 to 750° C. to form the glass ceramic.

15. A process of using the glass ceramic according to claim 1 for coating a dental restoration or for a preparation of a dental restoration.

16. The process according to claim 15, wherein the glass ceramic is given a shape of the dental restoration comprising a bridge, inlay, onlay, veneer, abutment, partial crown, crown or facet, by pressing or machining.

17. The process according to claim 15, wherein the glass ceramic is subjected to a heat treatment at a temperature of 750 to 950° C. for a duration of 1 to 60 minutes.

18. The process according to claim 15, in which the preparation of the dental restoration is performed by machining using a CAD/CAM process.

* * * * *